(12) United States Patent
Herchen

(10) Patent No.: US 6,875,331 B2
(45) Date of Patent: Apr. 5, 2005

(54) ANODE ISOLATION BY DIFFUSION DIFFERENTIALS

(75) Inventor: Harald Herchen, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 313 days.

(21) Appl. No.: 10/194,160

(22) Filed: Jul. 11, 2002

(65) Prior Publication Data

US 2004/0007459 A1 Jan. 15, 2004

(51) Int. Cl.[7] .................. C25D 21/18; C25B 15/00; C25C 7/04
(52) U.S. Cl. ............. 205/101; 204/232; 204/240; 204/242; 204/252; 204/263; 204/264; 204/266; 204/282; 204/295; 204/296; 205/799
(58) Field of Search ............. 205/101, 799; 204/242, 252, 263, 264, 266, 282, 295, 296, 232, 240

(56) References Cited

U.S. PATENT DOCUMENTS

| 4,242,193 A | 12/1980 | Moeglich ............ 204/296 |
| 4,299,675 A | 11/1981 | Korach ............... 204/95 |
| 4,326,935 A | 4/1982 | Moeglich ............ 204/180 P |
| 4,585,539 A | 4/1986 | Edson ................ 204/228 |
| 5,224,504 A | 7/1993 | Thompson et al. |

(Continued)

FOREIGN PATENT DOCUMENTS

| EP | 1 029 954 A1 | 8/2000 | ....... C25D/17/00 |
| EP | 1 136 595 A1 | 9/2001 | ....... C25D/21/14 |
| JP | 6-63343 | 3/1994 | ....... B01D/53/26 |
| JP | 8-45450 | 2/1996 | ....... H01J/31/15 |

OTHER PUBLICATIONS

Juang, et al., "Efficiencies of electrolytic treatment of complexed metal solutions in a stirred cell having a membrane separator," Journal of Membrane Science, 171 (2000) 19–29, no month.

Bossi, et al., "Production of D–Phenylglycine from Racemic (D,L)–Phenylglycine Via Isoelectrically–Trapped Penicillin G Acylase," University of Verona, Department of Industrial and Agricultural Biotechnologies, (1998), no month.

Suzuki, et al., "Synthesis of diamond by DC plasma chemical vapor deposition above the surface of a water–ethylene glycol solution," Japanese Journal of Applied Physics, part 2, vol. 26, Issue 4B, pp. L504–L506 (1997), Apr. 1997.

Cave, et al., "A mode of anoxic preconditioning in the isolated rat cardiac myocyte. Importance of adenosine and insulin," Basic Res Cardiol 91:210–218 (1996), no month.

(Continued)

*Primary Examiner*—Robert R. Koehler
(74) *Attorney, Agent, or Firm*—Moser, Patterson & Sheridan

(57) ABSTRACT

Embodiments of the invention generally provide an electrochemical plating cell having a cell body configured to contain a plating solution therein. An anode assembly is immersed in a fluid solution contained in the cell body, the anode being positioned in an anode compartment of the cell body. A cathode assembly is positioned in a cathode compartment of the cell body, and a multilevel diffusion differentiated permeable membrane is positioned between the anode compartment and the cathode compartment. The multilevel diffusion differentiated permeable membrane is generally configured to separate the anode compartment from the cathode compartment, while allowing a fluid solution to flow therethrough in a direction from the anode compartment towards the cathode compartment.

39 Claims, 7 Drawing Sheets

U.S. PATENT DOCUMENTS

| | | | |
|---|---|---|---|
| 5,252,196 A | 10/1993 | Sonnenberg et al. | |
| 5,489,341 A | 2/1996 | Bergman et al. | |
| 5,573,023 A | 11/1996 | Thompson et al. | |
| 5,620,581 A | 4/1997 | Ang | |
| 5,731,678 A | 3/1998 | Zila et al. | |
| 5,744,019 A | 4/1998 | Ang | |
| 5,837,120 A | 11/1998 | Forand et al. | |
| 5,840,438 A | 11/1998 | Johnson et al. | 429/30 |
| 5,883,762 A | 3/1999 | Calhoun et al. | 360/113 |
| 5,996,241 A | 12/1999 | Thompson et al. | |
| 6,014,817 A | 1/2000 | Thompson et al. | |
| 6,099,702 A | 8/2000 | Reid et al. | |
| 6,099,712 A | 8/2000 | Ritzdorf et al. | |
| 6,126,798 A | 10/2000 | Reid et al. | 204/282 |
| 6,132,857 A | 10/2000 | Champenois et al. | |
| 6,136,163 A | 10/2000 | Cheung et al. | |
| 6,156,167 A | 12/2000 | Patton et al. | |
| 6,179,983 B1 | 1/2001 | Reid et al. | |
| 6,197,181 B1 | 3/2001 | Chen | |
| 6,228,231 B1 | 5/2001 | Uzoh | |
| 6,228,232 B1 | 5/2001 | Woodruff et al. | |
| 6,248,222 B1 | 6/2001 | Wang | |
| 6,254,742 B1 | 7/2001 | Hanson et al. | |
| 6,261,433 B1 | 7/2001 | Landau | |
| 6,267,853 B1 | 7/2001 | Dordi et al. | |
| 6,273,110 B1 | 8/2001 | Davis et al. | |
| 6,280,582 B1 | 8/2001 | Woodruff et al. | |
| 6,290,833 B1 | 9/2001 | Chen | |
| 6,319,387 B1 | 11/2001 | Krishnamoorthy et al. | |
| 6,322,674 B1 | 11/2001 | Berner et al. | |
| 6,322,678 B1 | 11/2001 | Woodruff et al. | |
| 6,334,937 B1 | 1/2002 | Batz, Jr. et al. | |
| 6,368,475 B1 | 4/2002 | Hanson et al. | 204/275.1 |
| 6,375,837 B1 | 4/2002 | Yamasaki et al. | |
| 6,383,352 B1 | 5/2002 | Shyu et al. | |
| 6,391,166 B1 | 5/2002 | Wang | |
| 6,395,101 B1 | 5/2002 | Scranton et al. | |
| 6,395,152 B1 | 5/2002 | Wang | |
| 6,409,892 B1 | 6/2002 | Woodruff et al. | |
| 6,432,821 B1 | 8/2002 | Dubin et al. | |
| 6,436,249 B1 | 8/2002 | Patton et al. | |
| 6,440,295 B1 | 8/2002 | Wang | |
| 6,527,920 B1 | 3/2003 | Mayer et al. | |
| 6,551,479 B1 | 4/2003 | Graham et al. | |
| 6,551,487 B1 | 4/2003 | Reid et al. | |
| 6,569,299 B1 | 5/2003 | Reid et al. | |
| 6,589,401 B1 | 7/2003 | Patton et al. | |
| 2001/0004501 A1 | 6/2001 | Yi et al. | 429/34 |
| 2002/0027080 A1 | 3/2002 | Yoshioka et al. | 205/123 |
| 2002/0074233 A1 | 6/2002 | Ritzdorf et al. | |
| 2004/0016637 A1 | 1/2004 | Yang et al. | |
| 2004/0134775 A1 | 7/2004 | Yang et al. | |

OTHER PUBLICATIONS

Kaneko, et al. *"Fabrication of cylindrical sputtering apparatus and application of aluminum coating on thin cargon rods,"* Tanso, Issue 159, pp. 197–201 (1993), no month.

Kaneko, et al. *"Structure of coating films prepared by new type of cylindrical magnetron sputtering,"* Journal of the Vacuum Society of Japan, vol. 36, Issue 12, pp. 918–923 (1993), no month.

Besenhard, et al., *"Metallized microporous polypropylene membranes as a support for thin–film electrodes,"* Journal of Power Sources, 43–44 (1993) 493–498, no month.

Ueno, et al., *"Synthesis of CuIn/sub 5 S/sub 8 and CuInS/sub 2/by means of heterogeneous precipitation from aqueous solution,"* Denki Kaguku, vol. 55, Issue 3, pp. 263–364 (1987), no month.

Lanzi, et al., *"Some theoretical considerations on the design of a practical anode in an electrochemical reactor,"* Journal of Applied Electrochemistry 14 (1984) 425–426, no month.

Rizzo, et al. *"Deposizione di rame in reattori elettrochimici aletto fluido e a flussi incrociati,"* La Chimica e L'Industria, vol. 66, No. 1, (1984), no month.

Bissinger, *"Electroplating with improved layer thickness distribution,"* IBM Technical Disclosure Bulletin, vol. 27, No. 5, Oct. 1984.

ANODE ISOLATION BY DIFFUSION DIFFERENTIALS

BACKGROUND OF THE INVENTION

1. Field of the Invention

Embodiments of the invention generally relate to electrochemical plating systems, and in particular, electrochemical plating systems having an anode that is separated from a plating electrode by a multilevel diffusion differentiated permeable membrane.

2. Description of the Related Art

Metallization of sub-quarter micron sized features is a foundational technology for present and future generations of integrated circuit manufacturing processes. More particularly, in devices such as ultra large scale integration-type devices, i.e., devices having integrated circuits with more than a million logic gates, the multilevel interconnects that lie at the heart of these devices are generally formed by filling high aspect ratio (greater than about 4:1, for example) interconnect features with a conductive material, such as copper or aluminum, for example. Conventionally, deposition techniques such as chemical vapor deposition (CVD) and physical vapor deposition (PVD) have been used to fill these interconnect features. However, as the interconnect sizes decrease and aspect ratios increase, void-free interconnect feature fill via conventional metallization techniques becomes increasingly difficult. As a result thereof, plating techniques, such as electrochemical plating (ECP) and electroless plating, for example, have emerged as promising processes for void free filling of sub-quarter micron sized high aspect ratio interconnect features in integrated circuit manufacturing processes.

In an ECP process, for example, sub-quarter micron sized high aspect ratio features formed into the surface of a substrate (or a layer deposited thereon) may be efficiently filled with a conductive material, such as copper, for example. ECP plating processes are generally two stage processes, wherein a seed layer is first formed over the surface features of the substrate, and then the surface features of the substrate are exposed to an electrolyte solution, while an electrical bias is simultaneously applied between the substrate and a copper anode positioned within the electrolyte solution. The electrolyte solution is generally rich in ions to be plated onto the surface of the substrate, and therefore, the application of the electrical bias causes these ions to be urged out of the electrolyte solution and to be plated onto the seed layer.

An ECP plating solution generally contains several constituents, such as, for example, a copper ion source, which may be copper sulfate, an acid, which may be sulfuric or phosphoric acid and/or derivatives thereof, a halide ion source, such as chlorine, and one or more additives configured to control various plating parameters. Additionally, the plating solution may include other copper salts, such as copper fluoborate, copper gluconate, copper sulfamate, copper sulfonate, copper pyrophosphate, copper chloride, or copper cyanide, for example. The additives, which are often organics, may be, for example, levelers, inhibitors, suppressors, brighteners, accelerators, or other additives known in the art. These additives are typically materials that adsorb onto the surface of the substrate being plated. Useful suppressors typically include polyethers, such as polyethylene glycol, or other polymers, such as polyethylene-polypropylene oxides, which adsorb on the substrate surface, slowing down copper deposition in the adsorbed areas. Useful accelerators typically include sulfides or disulfides, such as bis(3-sulfopropyl) disulfide, which compete with suppressors for adsorption sites, and operate to facilitate copper deposition in the adsorbed areas. Useful levelers typically include thiadiazole, imidazole, and other nitrogen containing organics. Useful inhibitors typically include sodium benzoate and sodium sulfite, which operate to somewhat inhibit the rate of copper deposition on the substrate.

One challenge associated with ECP systems is that several of the components/constituents generally used in plating solutions are known to react with the surface of the copper anode. This reaction generally operates to deplete or consume the solution constituents, and therefore, renders the concentration of the particular constituents in the plating solution lower than desired. For example, is has been shown that constituent contact with the anode contributes upwards of 75% or more of the consumption or depletion of organic constituents in plating solutions. Another challenge associated with ECP systems is that contaminants produced at the surface of the anode, i.e., copper balls, are known to cause plating defects.

Therefore, there exists a need for an electrochemical plating cell configured to prevent solution additives from coming into contact with the anode. Additionally, there exists a need for an electrochemical plating cell configured to prevent contaminants generated at the anode surface from traveling to the plating electrode and causing defects in the plating process.

SUMMARY OF THE INVENTION

Embodiments of the invention generally provide an electrochemical plating cell having a cell body configured to contain a plating solution therein. An anode assembly is immersed in a fluid solution contained in the cell body, the anode assembly being positioned in an anode compartment of the cell body. A cathode assembly is positioned in a cathode compartment of the cell body, and a multilevel diffusion differentiated permeable membrane is positioned between the anode compartment and the cathode compartment. The multilevel diffusion differentiated permeable membrane is generally configured to separate the anode compartment from the cathode compartment, while allowing a fluid solution to flow therethrough in a direction from the anode compartment towards the cathode compartment.

Embodiments of the invention may further provide a multilevel diffusion differentiated permeable membrane for separating an anode compartment from a cathode compartment of an electrochemical plating cell. The multilevel diffusion differentiated permeable membrane generally includes a base membrane layer positioned proximate an anode in the electrochemical plating cell, the base membrane having pores formed therethrough sized between about 25 nm and about 75 nm. The multilevel diffusion differentiated permeable membrane also includes a middle membrane layer positioned on top of the base membrane layer away from the anode, the middle membrane layer having pores formed therethrough that are sized between about 10,000 nm and about 30,000 nm. The multilevel diffusion differentiated permeable membrane also includes a top membrane layer positioned on top of the base and middle membrane layers, the top membrane layer having pores formed therethrough sized between about 25 nm and about 75 nm.

Embodiments of the invention may further provide a method for minimizing depletion of plating solution additives at the anode of an electrochemical plating cell. The method includes positioning a multilevel diffusion differentiated permeable membrane between an anode and a cathode of the electrochemical plating cell to generate a cathode compartment and an anode compartment. The method further includes providing a first flow of a pure electrolyte solution to the anode compartment, and providing a second flow of the pure electrolyte solution and at least one plating additive to the cathode compartment. Additionally, a flow rate difference between the first flow and the second flow is configured to generate a pressure differential across the multilevel diffusion differentiated permeable membrane that causes a fluid flow through the membrane in a direction from the anode compartment to the cathode compartment.

BRIEF DESCRIPTION OF THE DRAWINGS

So that the manner in which the above recited features of the present invention are attained can be understood in detail, a more particular description of the invention, briefly summarized above, may be had by reference to the embodiments thereof, which are illustrated in the appended drawings. It is to be noted, however, that the appended drawings illustrate only typical embodiments of this invention, and are therefore, not to be considered limiting of its scope, for the invention may admit to other equally effective embodiments.

DETAILED DESCRIPTION OF THE PREFERRED EMBODIMENT

The present invention generally provides an electrochemical plating cell having separate compartments for the anode and the plating electrode/cathode. The anode compartment and the plating electrode compartment are generally separated by a multilevel diffusion differentiated permeable membrane configured to minimize travel of plating solution additives through the membrane in the direction of the anode, as well as to minimize or prevent contaminants generated at the surface of the anode from traveling through the membrane to the plating electrode and causing plating defects on the plating surface. Additionally, the present invention is configured to provide a controlled diffusion differential between the anode compartment and the plating electrode compartment. The diffusion differential is calculated to prevent the plating solution additives from diffusing through the multilevel diffusion differentiated permeable membrane and contacting the anode, which operates to reduce the additive depletion as a result of exposure to the anode. With regard to the permeability of the multilevel diffusion differentiated permeable membrane without the controlled diffusion differential being present, the membrane is generally fully permeable to all components in an electroplating bath, including plating solution additives, additive breakdown products, and negative and positive ions. However, the membrane is generally not permeable to particles, i.e., relatively large agglomerations of atoms and molecules, such as those particles having a diameter of greater than 50 nm, for example, which is generally larger than any of the plating solution additives or components. Further, the membrane is generally not charged or chemically active, i.e., the membrane is generally not configured to absorb or trap any particular species of molecules in the bath that is smaller in diameter than the pores formed therein.

Figure 1:
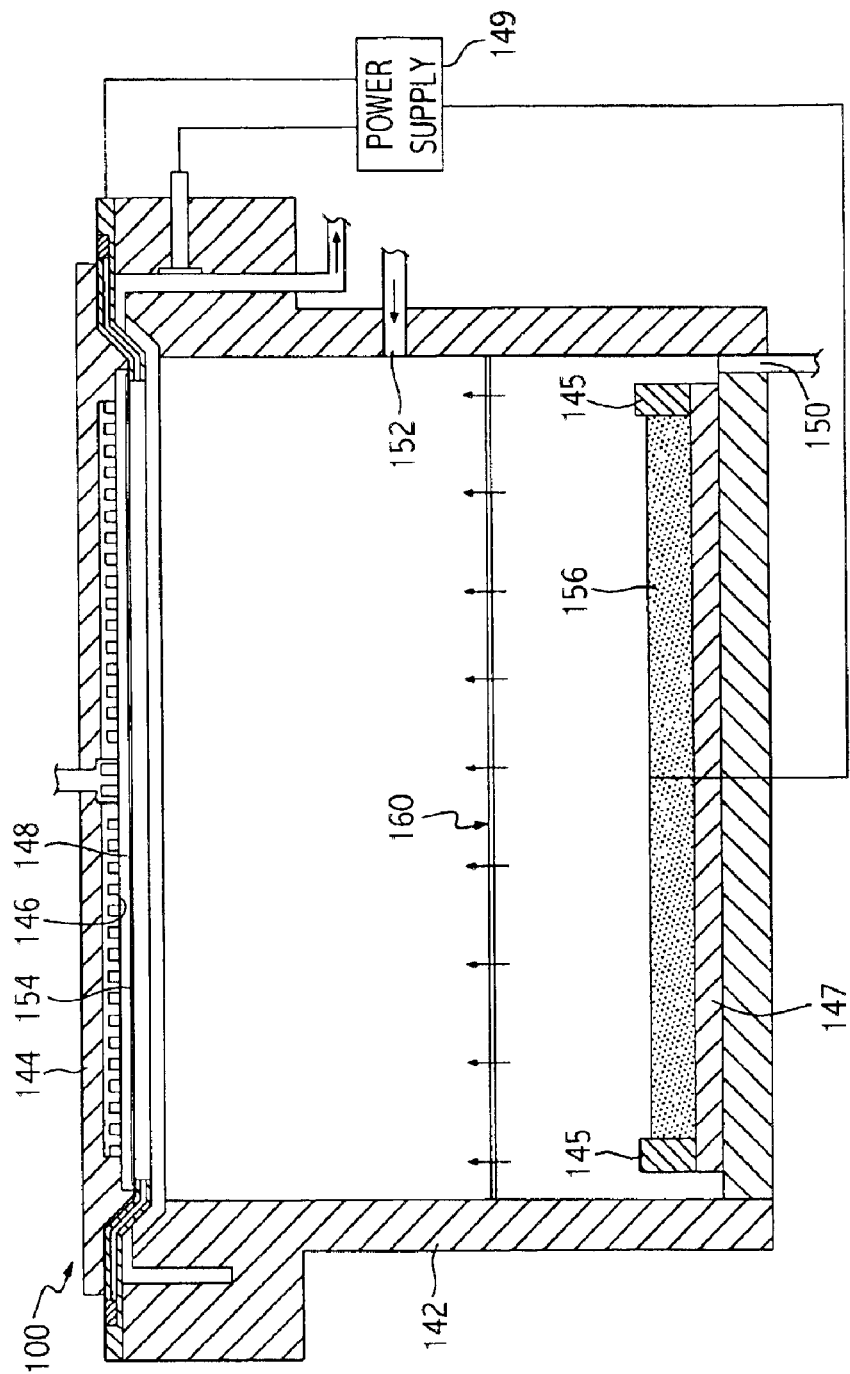
FIG. 1 illustrates a sectional view of an exemplary electrochemical plating cell of the invention.

FIG. 1 illustrates a sectional view of an exemplary electroplating cell 100 of the invention. The electroplating cell 100 generally includes a container body 142 having an opening on a top portion thereof. The opening on the top portion of the container body 142 is configured to receive a lid member 144 therein, thus forming an enclosed processing region. The container body 142 is preferably made of an electrically insulative material, such as a plastic, Teflon®, ceramics, or other materials known in the semiconductor art, and in particular, materials known in the electroplating art to be non-reactive with electroplating solutions. The lid 144 generally includes a substrate supporting surface 146 disposed on a lower surface thereof, i.e., the lower surface of the lid 144 that is facing the opening in the container body 142. A substrate 148 is shown in parallel abutment to the substrate supporting surface 146, and may be secured in this orientation via conventional substrate chucking methods, such as vacuum chucking, for example, during plating operations. A first electroplating solution inlet 152 is generally disposed through a sidewall of the container body 142, and operates to pump an electroplating solution into the portion of the container body 142 adjacent the substrate, i.e., the electrode chamber, via a suitable pump (not shown). The lower portion of container body 142 includes a second fluid inlet 150 configured to dispense a fluid solution into the area proximate the anode 156, i.e., into the anode compartment.

An anode 156, which is generally a consumable anode, is disposed in the lower portion of the container body 142 and is configured to slowly dissolve into the surrounding fluid solution at a calculated rate, which operates to supply metal ions, i.e., copper ions, to the solution for plating operations. The anode 156, which generally has the same perimeter shape as the interior wall of the container body 146, i.e., circular, for example, is generally positioned in an insulative sleeve member 145, which rests on a disk shaped base member 147. However, anode 156 generally does not extend across the entire width of the container body 142, and therefore, there is a gap or space between the inner wall of the container body and the outer surface of the sleeve 145. As such, the fluid dispensed into the anode compartment via the first fluid inlet 150 travels upward around the perimeter of sleeve 145 into the anode compartment. However, the anode compartment and the cathode compartment are separated from each other by a multilevel diffusion differentiated permeable membrane 160 positioned between the anode 156 and the substrate being plated, and therefore, the fluid dispensed into the anode compartment must pass through the membrane 160 in order to travel to the cathode compartment.

Figure 2:
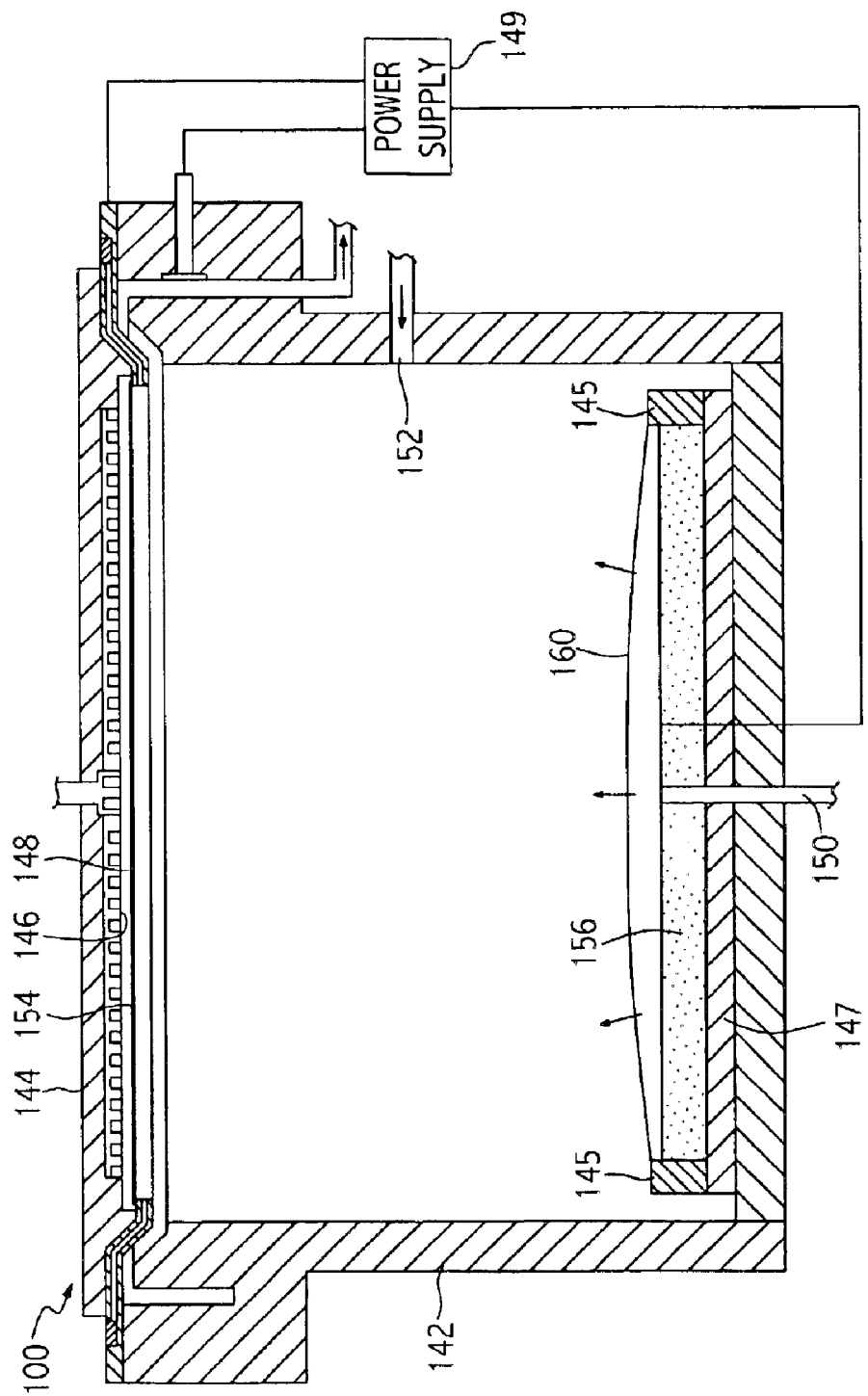
FIG. 2 illustrates a sectional view of another exemplary electrochemical plating cell of the invention.

The pressure differential generated across membrane 160 generally operates to cause the fluid dispensed into the anode compartment to travel through membrane 160 at a specific flow rate. Membrane 160, which will be further discussed herein, may be mounted, for example, to the inner wall of chamber body 142 above the upper surface of anode 156, as illustrated in FIG. 1. Alternatively, membrane 160 may be mounted to an upper portion of sleeve member 145, for example, and the fluid inlet 150 for the anode compartment may be positioned such that the fluid flow is through the anode 156, as illustrated in the exemplary embodiment of FIG. 2. Alternatively, the fluid inlet for the anode compartment may be positioned through a portion of sleeve 145, thus eliminating a need to drill a fluid inlet through the interior of the anode 156. Regardless of the specific configuration, membrane 160 is generally positioned above anode 156 and below the substrate being plated, which operates to separate the anode from the plating electrode/cathode (the substrate), thus generating the above mentioned anode and cathode compartments.

Figure 3:
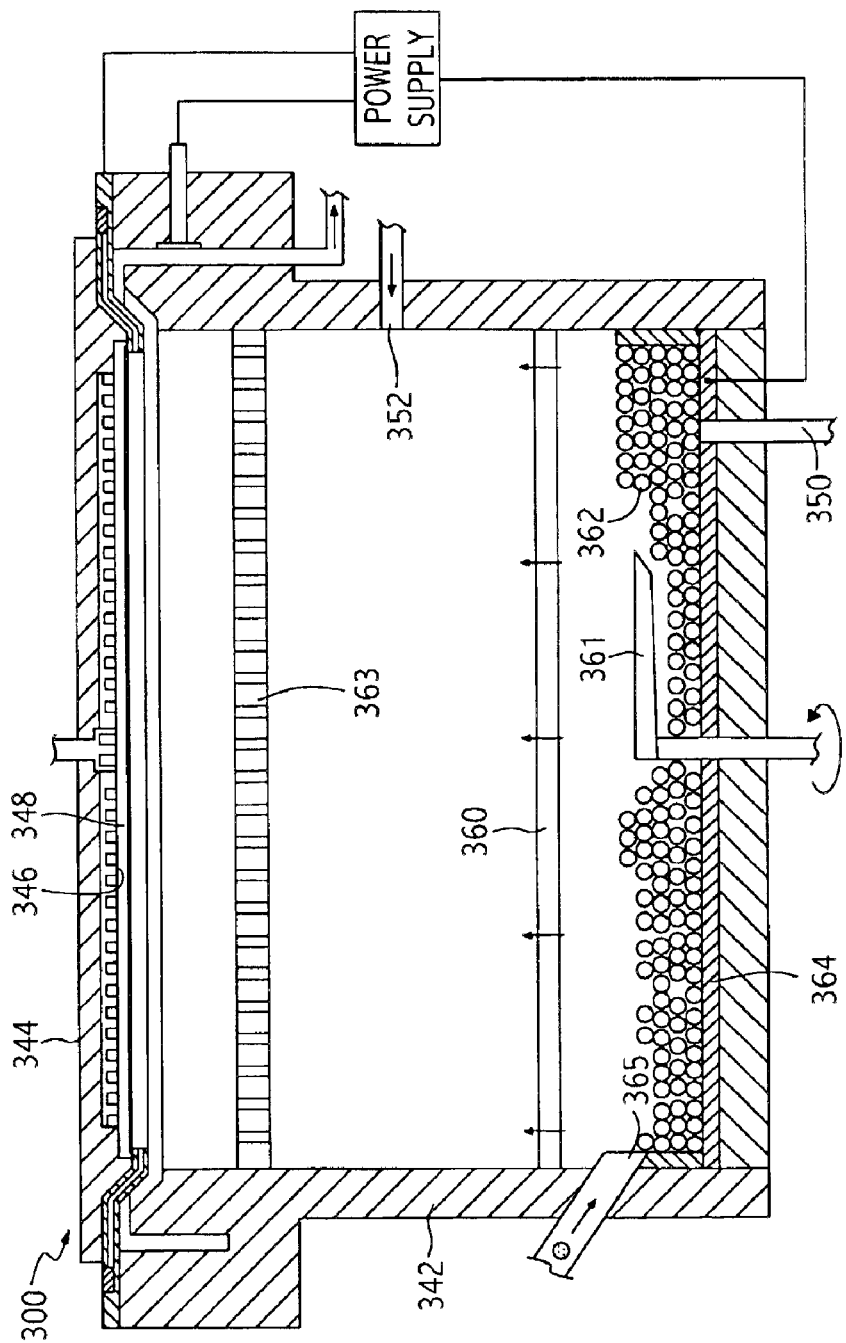
FIG. 3 illustrates a sectional view of an exemplary copper ball type electrochemical plating cell of the invention.

FIG. 3 illustrates a sectional view of another exemplary plating cell of the invention. Plating cell 300 generally includes a chamber body 342 having an open upper portion configured to receive a lid member of 344 therein. In similar fashion to previous embodiments, lid member 344 includes a substrate supporting surface 346 configured to receive and support a substrate 348 thereon for processing. The upper portion of chamber body 342, i.e., the portion of chamber 342 closest to lid member 344, includes a flow diffusion member 363 extending across the opening portion of chamber body 342. Flow diffusion member of 363 is generally configured to equalize the fluid flow therethrough, i.e., flow diffusion member 363 operates to evenly distribute the fluid flow through the diffusion member in the direction of the substrate being plated 348. Chamber body 342 also includes a fluid inlet 352, which is generally positioned below flow diffusion member 363 in a sidewall portion of the chamber body 342. Fluid inlet 352 is generally configured to supply electrolyte solution to the chamber body 342 for the purpose of supporting electroplating operations. Chamber body 342 also includes a multilevel diffusion differentiated permeable membrane 360, which is positioned in a lower portion of the chamber body 342, i.e., below flow diffusion member 363 and fluid inlet 352. The lower portion of chamber body 342 also includes a plurality of metal balls 362, which may be copper balls, for example, that are positioned within an insulative sleeve 364. Sleeve 364 generally conforms to the inside diameter of chamber body 342, and includes a conductive base portion configured to conduct an electrical bias to the copper balls positioned in sleeve 364. Therefore, sleeve 364 essentially encapsulates the metal balls 362 on three sides, as the top or upper side of the sleeve 364 is open to the multilevel diffusion differentiated permeable membrane 360, while the insulative sleeve sides form an annular wall around the copper balls and the conductive base member conducts an electrical bias to the copper balls positioned thereon. A rotatable stirring member 361 is positioned in a central location of the lower portion of chamber body 342 within sleeve 364. The rotatable stirring member 361 operates to stir the metal balls 362 within sleeve 364. Additionally, the lower portion of chamber body 342 includes a metal ball insertion chute 365 configured to receive metal balls at a location outside of chamber body 342 and communicate the metal balls into the lower portion of chamber body 342 proximate the other metal balls 362. The lower portion of chamber body 342 also includes a fluid inlet 350 configured to dispense a fluid into the anode compartment, which is generally defined as the volume of the chamber body 342 below the multilevel diffusion differentiated permeable membrane 360. The combination of the fluid inlets 350 and 352 operates to generate a pressure differential across the membrane 360, wherein the pressure differential is configured to cause fluid in the anode compartment to travel through the membrane 360 into the cathode compartment, while preventing reverse flow through the membrane 360.

Figure 4:
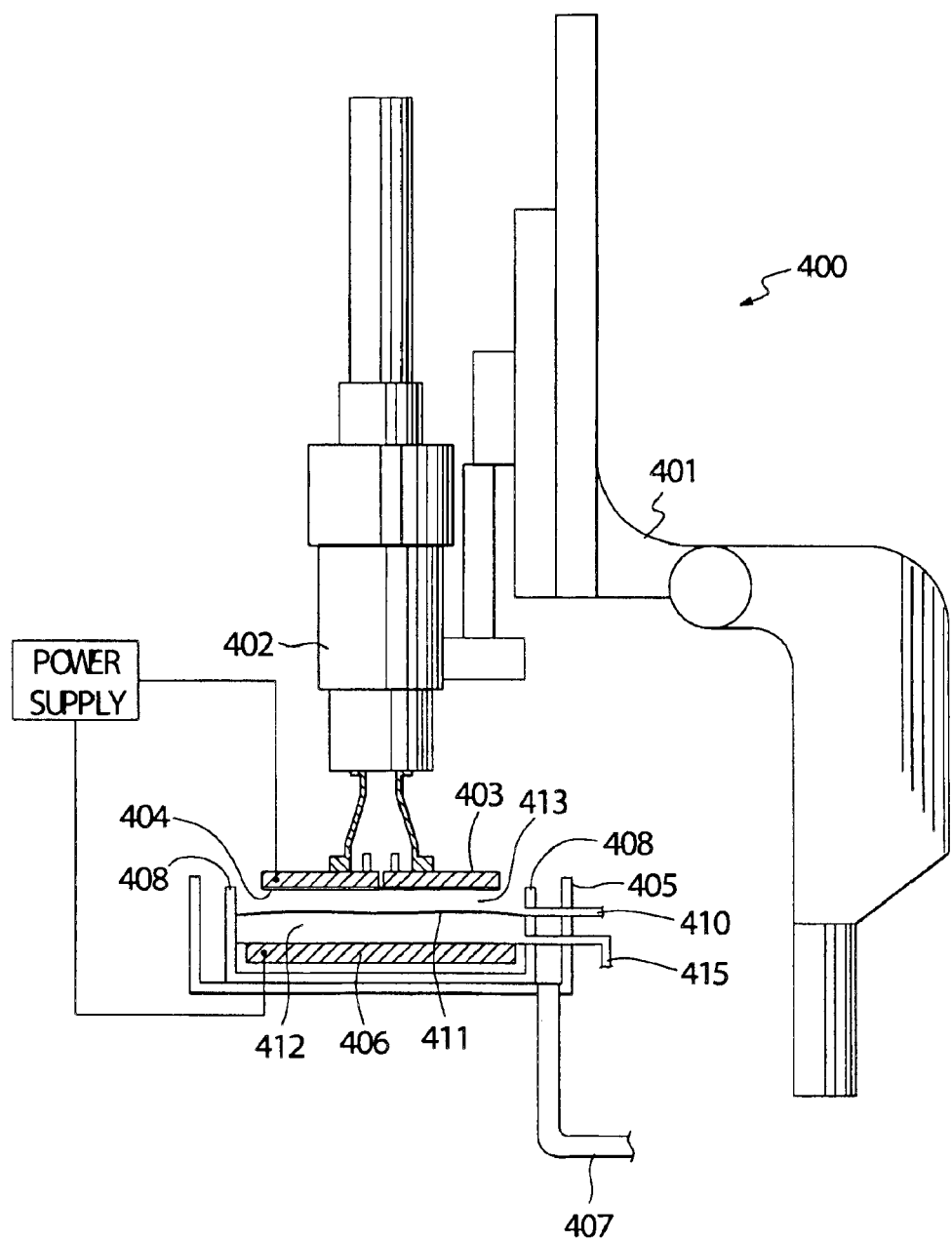
FIG. 4 illustrates a sectional view of an exemplary backside contact-type electrochemical plating cell of the invention.

FIG. 4 illustrates a sectional view of another embodiment of a plating cell that may be used to implement aspects of the invention. The plating cell illustrated in FIG. 4 is configured as a backside contact-type electrochemical plating cell 400. Plating cell 400 generally includes a support arm assembly 401 configured to support a head assembly 402. Arm assembly 401 generally supports head assembly 402 at a position above a plating bath in a manner that allows the head assembly 402 to position a substrate in a plating bath for processing. The head assembly 402 is generally attached to a substrate support member 403 at a lower portion thereof and is configured to provide vertical and rotational movement thereto. The substrate support member 403 is generally configured to support a substrate on a lower surface 404 thereof, i.e., wherein the lower surface is defined as the surface of the substrate support member positioned adjacent the plating bath. Additionally, the lower surface is configured to electrically contact the substrate to facilitate plating thereon. In this configuration, the substrate being plated is generally contacted on the backside or non-production side of the substrate, and therefore, the electrical current supplied thereto is conducted around the bevel edge of the substrate to the plating surface by a conductive layer on the substrate The plating bath of the plating cell 400 is generally contained within an inner basin 408, which is separated into two distinct regions: first, anode region 412; and second, a cathode region 413, both of which will be further described herein. The inner basin 408 generally resides within a larger diameter outer basin 405, which operates to collect and drain fluids received from the inner basin 408 via fluid drain 407. An anode assembly 406, which may be a consumable or non-consumable-type anode, for example, is generally positioned within the inner basin 408 and is generally configured to provide metal ions to the plating solution for the plating process. The upper portion of the inner basin 408, i.e., the cathode region 413, includes an electrolyte solution fluid inlet 410 configured to supply a plating electrolyte solution to the cathode region 413. A multilevel diffusion differentiated permeable membrane 411 is positioned across the diameter of inner basin 408 at a position below the electrolyte solution fluid inlet 410. As such, the membrane 411 operates to separate the cathode region 413 from the anode region 412, which is generally defined as the volume within inner basin 408 positioned proximate anode 406 below membrane 411. Anode region 412 includes an additional fluid solution inlet 415 which may enter into anode region 412 via the sidewall of inner basin 408, for example. The additional fluid inlet 415 may generally operate to supply a fluid solution exclusively to the anode region 412, i.e., the fluid provided to the anode region 412 generally must travel through the membrane 411 in order to get to the cathode region 413. Further, in similar fashion to previous embodiments, a pressure differential is generally generated across the membrane 411, wherein the pressure differential is configured to cause fluid flow through the membrane 411 in a direction from the anode towards the cathode, while preventing reverse flow through the membrane 411.

Figure 7:
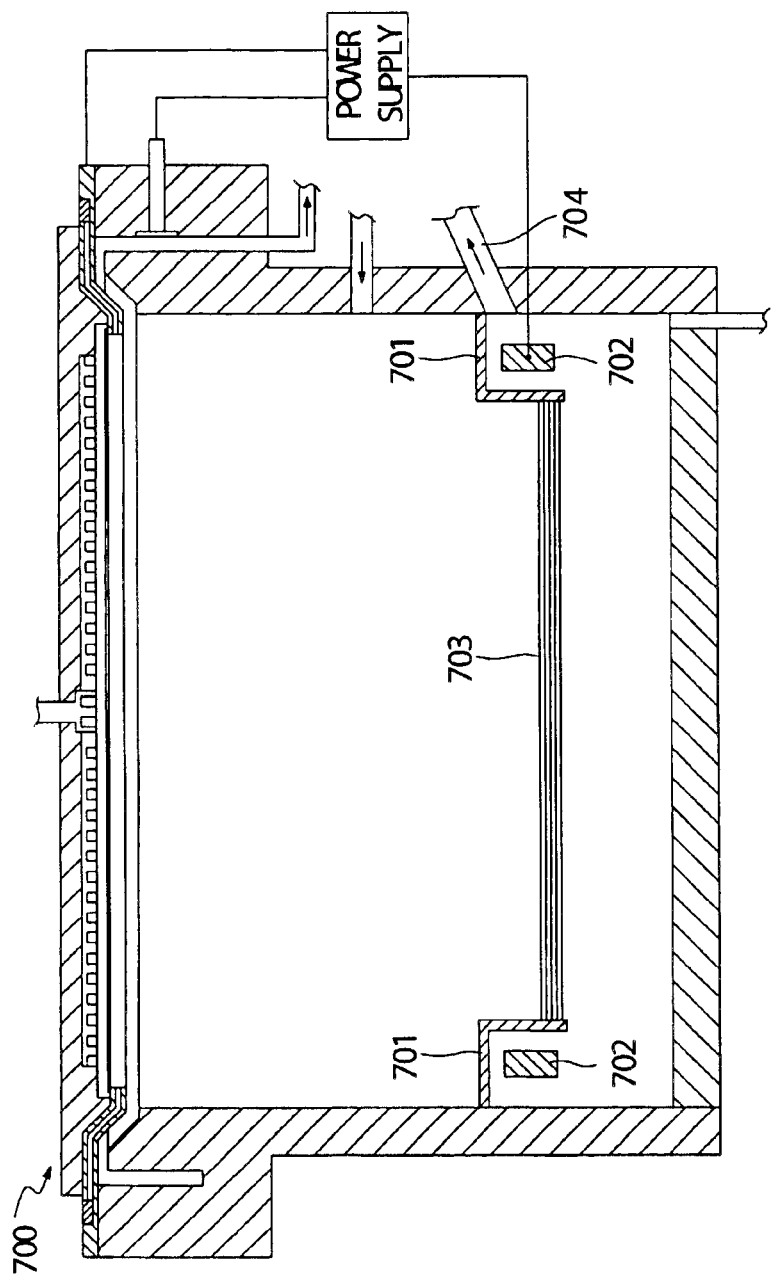
FIG. 7 illustrates an embodiment of the invention using an insoluble anode.

FIG. 7 illustrates another embodiment of a plating cell 700 of the invention, wherein an insoluble anode is used. Structurally, the embodiment illustrated in FIG. 7 is substantially similar to the embodiment illustrated in FIG. 3, however, the anode source is insoluble, and therefore, may generate a gas when exposed to the plating electrical bias and the electrolyte solution. Therefore, in embodiments where insoluble anodes are implemented, the anodes may be positioned below a gas shield 701 configured to receive any gas bubbles generated at the surface of the anode during the plating process (oxygen and hydrogen ions are often generated at the anode surface). In this configuration, the gas shield 701 generally extends downwardly at least to the lowest portion of the insoluble anode 702, and as such, gas bubbles will generally not travel up words around gas shield 701 towards the multilevel diffusion differentiated permeable membrane 703. Rather, gas bubbles generated at the surface of the insoluble anode may be captured and expelled from the plating cell via a gas outlet 704 positioned approximate the uppermost portion of gas shield 701.

In operation, when the insoluble anode is exposed to the plating solution and the plating bias is applied thereto, and water in the plating solution is broken down into oxygen gas and hydrogen ions at the surface of the anode. The gas bubbles travel upward and exit through the gas outlets 704 and the hydrogen ions are drawn electrically through the membrane 703 towards the plating surface. Within the bath, however, assuming a copper plating cell, the copper ions are depleted from the region closest to the substrate being plated. As such, the solution continues to flow with less and less copper and more and more hydrogen ions than the solution initially had. In order to restore the initial concentrations of copper and hydrogen, this hydrogen rich solution comes in contact with cupric oxide, and reacts to form water and copper ions. The copper ions are absorbed by the solution and operate to increase the copper concentration proximate the substrate being plated, while the water ions are circulated to again be in contact the insoluble anode and generate hydrogen ions and oxygen gas.

In each of the embodiments illustrated in FIGS. 1–4 and 7, a multilevel diffusion differentiated permeable membrane is positioned between an anode and the substrate being plated. The multilevel diffusion differentiated permeable membranes of the above noted embodiments are generally configured to provide a flow through-type porous membrane stack, along with a concomitant area chosen to keep the flow velocity through the membrane higher than the concentration gradient induced diffusion velocity of additives in the cathode region. Additionally, the surface area of the membrane stack may be carefully chosen in conjunction with a desired flow velocity, so that the total flow through the membrane stack is commercially viable and does not generate excess heat in the plating system. Each of the above noted embodiments provide fluid inlets configured to allow for the generation of a pressure differential across the membrane stack. This pressure differential is configured to cause a fluid flow through the membrane in a direction originating at the anode and traveling towards the cathode, while preventing reverse fluid flow through the membrane.

Structurally, the multilayer membrane stacks of the above noted embodiments generally include several membranes stacked together, i.e., a multilayer stack of membranes positioned adjacently, wherein each individual membrane in the stack may include a stepped pore size. Additionally, each individual membrane in the stack may include a stepped (increased or decreased) area over the adjacent membrane in the stack. The pore sizes of the membranes are generally in the range of about 10 nm to about 200 nm, for example. One purpose of the multilayer stepped pore size membranes is basically to generate a prefilter-type configuration, which keeps the membrane having the smallest pore size in the stack from clogging or fouling. Additionally, the multilayer membrane configuration reduces the likelihood that all of the membranes in the stack will contain defects in the same region of sufficient size to essentially bypass the flow restriction of the membrane, i.e., if a defect occurs in one membrane, the next membrane layer in the stack will generally be intact in the region of the defect, and therefore, maintain the integrity of the membrane stack.

Figure 6:
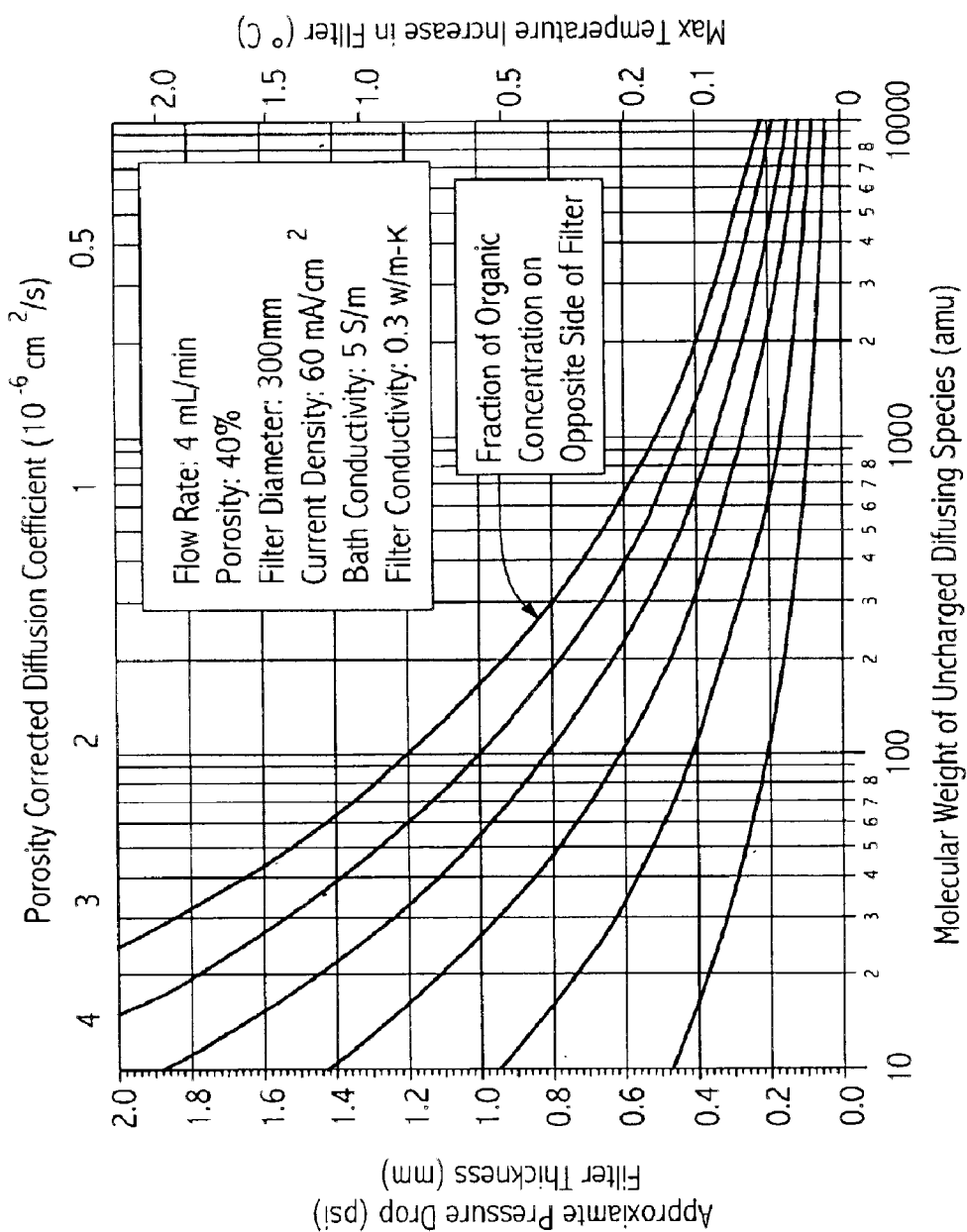
FIG. 6 illustrates a plot of $C(x)/C_o$.

More particularly, embodiments of the multilevel diffusion differentiated permeable membrane will generally include between about two and about three primary layers, i.e., layers configured to filter or generate the above noted pressure differential, that cooperatively form a membrane stack. Additionally, the membrane stack may include additional outer layers that operate to protect the inner two or three primary membrane layers, i.e., structural support layers. In a three (primary) layer membrane stack, for example, the bottom layer of the three primary layers (generally the primary layer positioned closest to the anode) is a relatively thin layer and has very small pores. For example, the pores in the bottom primary layer may be between about 5 nm and about 100 nm, between about 25 nm and about 75 nm, between about 35 nm and about 55 nm, or nominally, about 50 nm, for example. The primary function of the bottom layer is to provide a pressure drop or differential across the bottom layer, which at low flow rates, i.e., flow rates that are less than general plating flow rates, is still higher than the macroscopic pressure differentials that are generated by momentum changes in the fluid near the membrane. The second primary layer is generally a more porous layer than the bottom layer. For example, the second primary layer, which generally is positioned immediately on top of the bottom layer, generally includes pore sized between about 10,000 nm and about 30,000 nm, between about 22,000 nm and about 27,000 nm, or generally, about 25,000 nm, for example. Given this pore size, the primary purpose of the second primary layer is to provide control over the concentration of a particular species diffusing therethrough. Additionally, the thickness of the second layer may be selected to provide control over the concentration, however, the thickness should not be selected to be too thick, as an overly thick membrane will likely generate excessive heat. The exact selection of pore size and thickness to yield the desired concentration gradient without overheating is illustrated in FIG. 6, which will be further discussed herein. The third or top primary layer in a three primary layer membrane stack generally operates in the same manner as the bottom primary layer, but in reference to momentum changes on the upper or cathode side of the bath.

Figure 5:
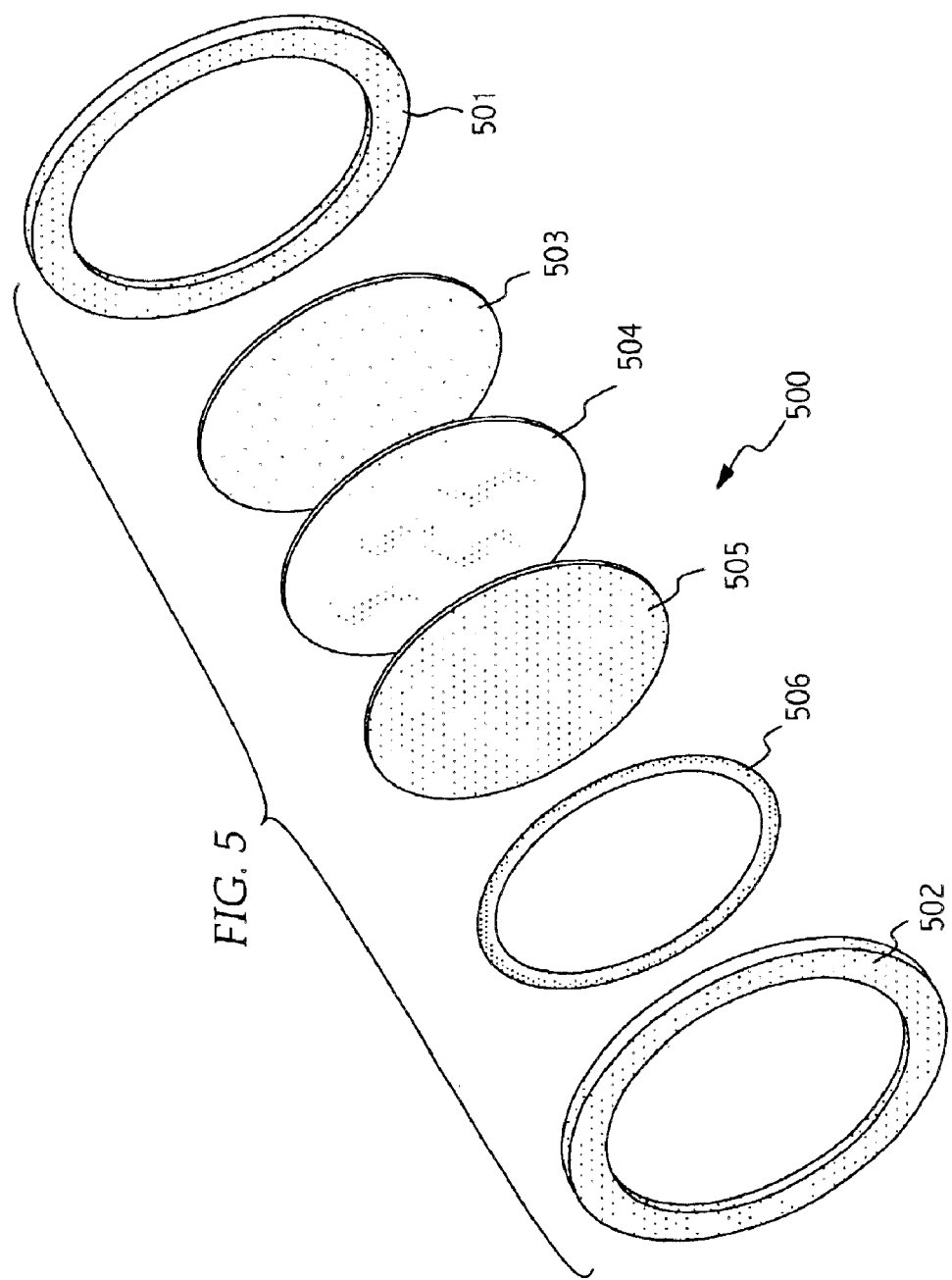
FIG. 5 illustrates a perspective view of an exemplary membrane stack of the invention.

FIG. 5 illustrates a perspective view of an exemplary multilevel diffusion differentiated permeable membrane 500 of the invention. The exemplary membrane structure 500 generally includes a rigid membrane holder 501, which may be a substantially rigid annular member having an open central portion sized to have the membrane stack positioned above and across the open central portion. A first layer 503 of the membrane stack may, for example, include a porex-type disk. First layer 503 is generally affixed to the membrane holder 501 via mechanical clamping, gluing, welding, or other affixation method suitable for attaching a membrane to a substantially rigid structure. A second layer 504 is positioned adjacent the first layer 503 and also affixed via the above noted affixation means. The second layer, for example, may include a PVDF V70-type membrane. A third layer 505 is generally positioned adjacent the second layer 504. The third layer 505 may be, for example, sheets and laminates of man-made fibers, such as a Tyvek® membrane, for example. The membrane 500 generally terminates with a membrane clamp member 502 that is configured to secure the respective membrane layers between the clamp ring and the membrane holder. The membrane clamp ring, therefore, is generally secured to the membrane holder via a mechanical means, such as screws, bolts, clamps, or other known securing devices. Additionally, an o-ring-type seal 506 may be positioned below the membrane clamp member 506 and above the third membrane layer 505 to seal against fluid leakage from the anode compartment to the plating electrode compartment. Thus, seal 506 operates to fluidly seal the anode compartment from the cathode compartment, so that all fluid traveling between the respective compartments must flow through the membrane stack.

In another embodiment of the invention, a membrane stack may include the following layers, starting with the layer closest to the anode: first, a Tyvek® type membrane layer; second, a PVDF layer; third, an HDPE layer; and finally, a support structure. The pore size of the Tyvek® membrane may be between about 3 $\mu$m and about 7 $\mu$m, for example, or about 5 $\mu$m nominally, with a membrane thickness of between about 80 $\mu$m and about 120 $\mu$m, nominally about 100 $\mu$m. The PVDF layer generally includes an ultrafiltration high pressure drop porous hydrophylized PVDF membrane having a pore size of about 70,000 Daltons (1 Dalton generally equates to 1 atomic mass unit), which is about 50 nm), and a thickness of between about 30 $\mu$m and about 100 $\mu$m. The HDPE layer, which may be made of porous PVDF, for example, and may have a thickness of between about 0.5 mm and about 5 mm. For example, HDPE layer membranes having a thickness of about 0.9 mm or about 3.4 mm may be implemented. The pore sizes of the respective membranes is generally between about 12 $\mu$m and about 50 $\mu$m, which may yield a nominal pore size of about 25 $\mu$m. The purpose of each layer is different, and more particularly, the purpose of the Tyvek® layer is to provide some mechanical protection and to stop large particles from passing through the membrane. Additionally, the Tyvek® also operates to prevent copper balls and other particles larger than the selected pore size from traveling therethrough. The hydrophylized PVDF functions as a pressure boundary, so that the minor pressure fluctuations that occur over time or spatially across the membrane do not alter the flow direction through the membrane to reverse, i.e., the PVDF layer prevents backflow through the membrane stack, which if allowed, would allow solution additives to diffuse through the membrane and contact the anode, thus resulting in excess depletion of the additives at the anode. The HDPE membrane layer has the additional function of distributing the pressure differential induced to the nearby support structure. The support layer, for example, may consist of stiff plastic beams, possibly concentric ones attached by cross members, which cooperatively operate to prevent the membrane stack from bending or stretching excessively.

In another embodiment of the invention, the multilevel diffusion differentiated permeable membrane may include a dual layer membrane having a PVDF ultrafiltration layer similar to the PVDF layer discussed above as a bottom or base layer to a membrane stack, along with a porous HDPE or PVDF layer stacked on top of the bottom layer acting as a diffusion boundary and providing mechanical support. The pore size of the top diffusion boundary layer, for example, may be about 25 $\mu$m. Although the third layer noted above is not utilized in this dual layer embodiment, sufficient pressure drop to compensate for momentum change induced spatial variations may be generated. More particularly, since fluid is incompressible, the lower ultrafiltration layer may provide sufficient pressure drop to compensate for spatial pressure variations both upstream and downstream of the membrane. However, the upstream and downstream variations are generally independent, and therefore, they may add together to generate a larger local pressure variation, which may be better addressed by the third ultrafiltration layer. Regardless, in the dual membrane configuration there is generally no Tyvek® layer, as the particles are heavy and the vertical flow is generally slow enough to prevent the particles from being trapped in the membrane.

In another embodiment of the invention, the multilevel diffusion differentiated permeable membrane configuration is utilized to separate the anode from the plating electrode, i.e., to generate an anode compartment and a plating electrode compartment, as discussed in the embodiments above. However, as noted above, through the implementation of the multilevel diffusion differentiated permeable membrane, it is an object of the present invention to minimize plating solution additives entering into the anode compartment and contacting anode. Therefore, the present invention may circulate a plating solution fluid into the anode compartment, however, the plating solution circulated into the anode compartment may be separate from the plating solution provided to the plating electrode compartment. More particularly, the plating solution provided to the plating electrode compartment generally includes the solution additives mentioned above. The plating solution provided to the anode compartment, may, for example, not include the plating solution additives that are present in the plating solution provided to the plating electrode compartment. As such, the consumption or depletion of plating solution additives at the anode may be minimized. Therefore, in this embodiment of the invention, a plating solution having additives therein may be provided to the plating electrode compartment, while a plating solution that is void of additives, i.e., a pure plating solution, is provided to the anode compartment, so that the negative effects generated by the plating solution additives contacting the anode may be minimized and/or eliminated. Inasmuch as conventional chemical membrane configurations generally implemented a complete separation of additives via the membrane, the multilevel diffusion differentiated permeable membrane eliminates the chemically complex conventional membrane structure. Thus, through the implementation of multilevel diffusion differentiated permeable membrane and the appropriate diffusion differential applied across the membrane, embodiments of the invention generally operate to substantially reduce the additive consumption at the anode, without the complexity of implementing chemically active membranes, such as cationic membranes, for example.

With regard to the diffusion differentials, an important factor with regard to the multilevel diffusion differentiated permeable membrane of the invention is to insure that local oscillations in the fluid velocity are not reflected in the fluid passing through the membrane. As such, if the flow direction through the membrane is temporarily reversed, then potential contamination molecules will not be allowed to diffuse or travel through the membrane with the reverse flow, as the stacked membranes will generally stop the contamination molecules from reverse traveling through during short duration flow reversals. As such, embodiments of the present invention are generally configured to provide a calculated diffusion differential across the multilayer membrane, wherein the diffusion differential is generally selected to maintain a fluid flow through the multilayer membrane in the direction going from the anode towards the substrate being plated, as indicated by the upward arrows going through the membranes in FIGS. 1–4. The calculated differential may be generated by carefully controlling the fluid flow into the respective anode and cathode compartments through the respective separate fluid inlets in the chambers.

Therefore, when the desired diffusion differentials are maintained, additives in the plating solution delivered to the cathode compartment, i.e., organic additives such as levelers and suppressors, are maintained in the cathode compartment and are generally restricted from traveling through the multilayer membrane and contacting the anode. Inasmuch as the additives contacting the anode are minimized through these configurations, the resultant breakdown of the additives at the anode encountered by conventional plating devices may be minimized and/or eliminated by the present invention.

With regard to the calculated diffusion differential across the multilevel diffusion differentiated permeable membrane, the diffusion and advection of a species may generally be described by equation (1), wherein C represents the concentration of the species of interest, D represents the diffusion coefficient of the species, and v represents the velocity of the fluid.

$$D\nabla^2 C - v\nabla C = \frac{\partial C}{\partial t} \quad (1)$$

Under steady state conditions, equation (1) may be represented by equation (2).

$$D\bar{\nabla}^2 C - v\bar{\nabla} C = 0 \quad (2)$$

Therefore, the solution to equation (2) in one dimension, wherein x represents the distance from an assumed infinite source of diffusing species, is represented by equation (3).

$$C(x) = C_0 e^{\frac{vx}{D}} \quad (3)$$

Thus, if the flow velocity of a fluid is directed against a diffusion gradient, i.e., if vx<0, then the species concentration will generally drop exponentially with velocity, membrane thickness, and the inverse of the diffusion coefficient. For example, FIG. 6 illustrates a plot of $C(x)/C_o$, and additionally, FIG. 6 illustrates the temperature and pressure reached at the upstream side of the membrane. In order to adequately comprehend these relationships, it is necessary to consider the relationships between the molecular weight and the diffusion coefficient and the relationship between the porosity and the diffusion coefficient.

Equation (3) may be applied to the multilevel diffusion differentiated permeable membrane, and in particular, equation (3) may be helpful in the selection of the second or middle primary layer of the three layer membrane discussed above. More particularly, the second layer is generally implemented to increase the value for x in equation (3). Note, that in order to decrease the concentration of a particular diffusing species per equation (3), the only parameters that may be controlled or varied are the velocity (v) and the distance (x), as D is fixed by the species size, bath viscosity, and temperature, all of which are fixed parameters in the system. Further, the velocity is generally at the maximum value, and therefore also essentially a fixed value, as higher flow velocities directly equate to higher production costs as a result of the increased volume of plating solution required to support the higher flow velocity. Therefore, the second or middle layer of the three primary layer membrane stack is generally chosen to decrease the concentration significantly, however, if the thickness of this layer is too thick, then the layer will overheat. Thus, there is a delicate balance between the thickness of the membrane, the flow velocity through the membrane, and the concentration difference, which is graphically illustrated in FIG. 6. Additionally, the velocity v in equation (3) is also dependent upon the diameter/surface area of the membrane. Generally, the primary factor influencing the surface area of the membrane is the need for the membrane to be sized similarly to the substrate being plated and the need for the membrane to be able to dissipate heat effectively and/or not generate excessive heat (more area results in less heating and better cooling, as well as a reduced flow velocity therethrough, which may be compensated for by an increase in x).

Further to equation (3), the diffusion constant appears in the First Law of Diffusion, which is illustrated in equation (4), wherein J represents the species flux.

$$J = -D\frac{\partial C(x, t)}{\partial x} \quad (4)$$

Therefore, using conservation of mass, equation (5) may be derived.

$$\frac{\partial C}{\partial t} = \frac{\partial J}{\partial x} \quad (5)$$

Upon combining equations (4) and (5), a mathematical statement of Frick's Law is generated, as illustrated in equation (6).

$$\frac{\partial C}{\partial t} = D\frac{\partial^2 C}{\partial x^2} \quad (6)$$

Careful review of equation (6) illustrates that this equation is simply equation (1), wherein there is no flow, i.e., v=0. The actual values of the diffusion coefficient are known to be dependent upon properties such as the molecular weight, fluid properties, temperature, and the porosity of the material through which the species is to diffuse. The diffusion coefficient generally scales approximately as the inverse of the cube root of the molecular weight, and therefore, the diffusion coefficient may generally be approximated as being inversely proportional to the molecular weight to the $\frac{3}{8}^{th}$ power. The porosity of a structure through which the species diffuses also affects the diffusivity. For example, the porosity and the diffusivity are generally related in a linear fashion, and as illustrated in FIG. 6, at a typical porosity of 40 percent, the effective diffusion coefficient is reduced to about 25% of the full value. Furthermore, heating of the membrane also should be accounted for in calculating the desired diffusion differential. For example, generally, heat is generated in proportion to the electrical resistance, which in turn depends on the diffusivity of ions. Generally, and given the low flow velocity of electrolyte through the stacked membrane of the present invention, cooling of the membrane stack results primarily from conduction. Thus, with the assumption of 0.3 W/m-K heat transfer coefficient, and assuming that cooling only occurs on the downstream side, the maximum temperature increase in a membrane stack of the invention is illustrated on the right hand scale of FIG. 6. Generally, this temperature increase is small enough to avoid thermally induced plating solution additive breakdown.

With regard to the selection and/or determination of the diffusion differential across the multilayer membrane, the diffusion differential is generally selected to generate an effective separation between the anode and cathode regions as a result of an upward (toward the cathode) flow of fluid through the membrane. This upward flow of fluid resists and/or opposes the plating solution additives that are attempting to diffuse toward the anode through the membrane. Therefore, using this principle, embodiments of the invention utilize a flow rate through the membrane that is calculated to overcome the diffusion rate of solution additives towards the anode. In addition to preventing solution additives from reaching the anode and generating additional depletion thereof, the diffusion differential and the membrane structure also operates to maintain copper balls that are known to be produced in the anode region of an electrochemical plating cell in the anode cell and away from the substrate being plated, as the copper balls are known contaminants for plating operations. The copper balls are restricted from reaching the substrate, as the balls are generally of sufficient size to be trapped or prevented from traveling from the anode through the multilayer membrane to the substrate being plated. Other parameters of the membrane that are relevant to the operation of the present invention include temperature/heating, membrane thickness, membrane porosity, and wetability of the multilayer membrane, as discussed above.

While the foregoing is directed to embodiments of the present invention, other and further embodiments of the invention may be devised without departing from the basic scope thereof, and the scope thereof is determined by the claims that follow.

What is claimed is:

1. An electrochemical plating cell, comprising:
   a cell body configured to contain a plating solution therein;
   an anode assembly immersed in a fluid solution and positioned in an anode compartment of the cell body;
   a cathode assembly positioned in a cathode compartment of the cell body; and
   a multilevel diffusion differentiated permeable membrane positioned between the anode compartment and the cathode compartment, the multilevel diffusion differentiated permeable membrane being configured to separate the anode compartment from the cathode compartment while allowing a fluid solution to flow therethrough in a direction from the anode compartment toward the cathode compartment.

2. The electrochemical plating cell of claim 1, wherein the multilevel diffusion differentiated permeable membrane comprises:
   a first porous membrane layer positioned closest to the anode assembly and having pores sized between about 5 nm and about 100 nm;
   a second porous membrane layer positioned adjacent the first membrane layer on an opposite side of the first membrane layer from the anode assembly, the second membrane layer having pores sized between about 10,000 nm and about 30,000 nm; and
   a third porous membrane layer positioned adjacent the second porous membrane layer on a side opposite the anode assembly, the third porous membrane layer having pores sized between about 25 nm and about 75 nm.

3. The plating cell of claim 2, wherein the first porous membrane layer contains pores sized between about 35 nm and about 55 nm.

4. The plating cell of claim 2, wherein the first porous membrane layer is configured to generate a pressure drop across the first porous membrane layer, which at low flow rates, remains greater than macroscopic pressure differentials that are generated by momentum changes in the fluid solution near the first porous membrane layer.

5. The plating cell of claim 2, wherein the second porous membrane layer has pores sized between about 22,000 nm and about 27,000 nm.

6. The plating cell of claim 2, wherein the second porous membrane layer is configured to provide control over a concentration of a particular species diffusing therethrough.

7. The plating cell of claim 2, further comprising a rigid membrane holder configured to clamp the first porous membrane layer, the second porous membrane layer, and the third porous membrane layer into a membrane stack.

8. The plating cell of claim 1, wherein the multilevel diffusion differentiated permeable membrane comprises:
   a first membrane layer positioned proximate the anode assembly, the first membrane layer being a porex-type disk layer;
   a second membrane layer positioned adjacent the first membrane layer, the second membrane layer being a PVDF-type membrane; and
   a third membrane layer positioned adjacent the second membrane layer.

9. The plating cell of claim 7, wherein the rigid membrane holder comprises a clamp ring structure configured to secure the first, second, and third membrane layers together in a membrane stack.

10. The plating cell of claim 8, further comprising an o-ring seal positioned adjacent the third membrane layer and being configured to fluidly seal the anode compartment from the cathode compartment so that all fluid passing between the respective compartments must pass through the multilevel diffusion differentiated permeable membrane.

11. The plating cell of claim 1, further comprising a first fluid inlet positioned to supply a plating solution to the cathode compartment and a second fluid inlet positioned to supply a fluid solution to the anode compartment, the first and second fluid inlets being controlled to provide a pressure differential across the multilevel diffusion differentiated permeable membrane, the pressure differential providing for a fluid flow through the multilevel diffusion differentiated permeable membrane in a forward direction from the anode compartment to the cathode compartment.

12. The plating cell of claim 11, wherein the pressure differential is configured to prevent additives in the plating solution in the cathode compartment from diffusing through the multilevel diffusion differentiated permeable membrane into the anode compartment.

13. The plating cell of claim 11, wherein the pressure differential is configured to prevent a reverse flow direction through the multilevel diffusion differentiated permeable membrane when pressure fluctuations occur over time or spatially across the membrane.

14. The plating cell of claim 1, wherein the multilevel diffusion differentiated permeable membrane is configured to insure that local oscillations in fluid velocity are not reflected in a velocity of a fluid passing through the multilevel diffusion differentiated permeable membrane.

15. The plating cell of claim 1, wherein the multilevel diffusion differentiated permeable membrane comprises:
   a first membrane layer positioned closest to the anode assembly, the first membrane layer being a layer having sheets and laminates of fibers;
   a second membrane layer positioned adjacent the first membrane layer, the second membrane layer being a PVDF layer; and
   a third membrane layer positioned adjacent the second membrane layer, the third membrane layer being an HDPE layer.

16. The plating cell of claim 15, wherein the first layer has a thickness of between about 80 μm and about 120 μm and a pore size of between about 3 μm and about 7 μm.

17. The plating cell of claim 15, wherein the second layer comprises an ultrafiltration high pressure drop porous hydrophylized PVDF membrane having a pore size of about 70,000 Daltons and a thickness of between about 30 μm and about 100 μm.

18. The plating cell of claim 15, wherein the third layer has a thickness of about 0.9 mm and a pore size of between about 12 μm and about 50 μm.

19. A multilevel diffusion differentiated permeable membrane for separating an anode compartment from a cathode compartment of an electrochemical plating cell, the multilevel diffusion differentiated permeable membrane comprising:
    a base membrane layer positioned proximate an anode in the electrochemical plating cell, the base membrane having pores formed therethrough sized between about 25 nm and about 75 nm;
    a middle membrane layer positioned on top of the base membrane layer away from the anode, the middle membrane layer having pores formed therethrough that are sized between about 10,000 nm and about 30,000 nm; and
    a top membrane layer positioned on top of the base and middle membrane layers, the top membrane layer having pores formed therethrough sized between about 25 nm and about 75 nm.

20. The multilevel diffusion differentiated permeable membrane of claim 19, wherein the base membrane layer contains pores sized between about 35 nm and about 55 nm.

21. The multilevel diffusion differentiated permeable membrane of claim 19, wherein the base porous membrane layer is configured to generate a pressure drop across the base porous membrane layer, which at low flow rates, remains greater than macroscopic pressure differentials that are generated by momentum changes in fluids near the base porous membrane layer.

22. The multilevel diffusion differentiated permeable membrane of claim 19, wherein the middle membrane layer has pores sized between about 22,000 nm and about 27,000 nm.

23. The multilevel diffusion differentiated permeable membrane of claim 19, wherein the middle membrane layer is configured to provide control over a concentration of a particular species diffusing therethrough.

24. The multilevel diffusion differentiated permeable membrane of claim 19, further comprising a rigid membrane holder configured to clamp the base membrane layer, the middle membrane layer, and the top membrane layer into a membrane stack.

25. A multilevel diffusion differentiated permeable membrane, comprising:
    a first membrane layer positioned proximate an anode of the electrochemical plating cell, the first membrane layer being a porex-type disk layer;
    a second membrane layer positioned adjacent the first membrane layer, the second membrane layer being a PVDF-type membrane; and
    a third membrane layer positioned adjacent the second membrane layer, the third membrane layer having sheets and laminates of fibers.

26. The multilevel diffusion differentiated permeable membrane of claim 25, further comprising a clamp ring structure configured to secure the first, second, and third membrane layers together in a membrane stack.

27. The multilevel diffusion differentiated permeable membrane of claim 25, further comprising an o-ring seal positioned adjacent the third membrane layer and being configured to fluidly seal an anode compartment from a cathode compartment of the electrochemical plating cell so that all fluid passing between the respective compartments must pass through the multilevel diffusion differentiated permeable membrane.

28. The multilevel diffusion differentiated permeable membrane of claim 25, wherein the multilevel diffusion differentiated permeable membrane is configured to insure that local oscillations in fluid velocity are not reflected in a velocity of a fluid passing through the multilevel diffusion differentiated permeable membrane.

29. The multilevel diffusion differentiated permeable membrane of claim 25, wherein the multilevel diffusion differentiated permeable membrane comprises:
    a first membrane layer positioned closest to the anode assembly, the first membrane layer being a Tyvek layer;
    a second membrane layer positioned adjacent the first membrane layer, the second membrane layer being a PVDF layer; and
    a third membrane layer positioned adjacent the second membrane layer, the third membrane layer being an HDPE layer.

30. The multilevel diffusion differentiated permeable membrane of claim 29, wherein the first layer has a thickness of between about 80 μm and about 120 μm and a pore size of between about 3 μm and about 7 μm.

31. The multilevel diffusion differentiated permeable membrane of claim 29, wherein the second layer comprises an ultrafiltration high pressure drop porous hydrophylized PVDF membrane having a pore size of about 70,000 Daltons and a thickness of between about 30 μm and about 100 μm.

32. The multilevel diffusion differentiated permeable membrane of claim 29, wherein the third layer has a thickness of about 0.9 mm and a pore size of between about 12 μm and about 50 μm.

33. A method for minimizing depletion of plating solution additives at the anode of an electrochemical plating cell, comprising:
    positioning a multilevel diffusion differentiated permeable membrane between an anode and a cathode of the electrochemical plating cell to generate a cathode compartment and an anode compartment,
    providing a first flow of a pure electrolyte solution to the anode compartment; and
    providing a second flow of the pure electrolyte solution and at least one plating additive to the cathode compartment, the combination of the first and second flows cooperatively generating a fluid flow between the anode compartment and the cathode compartment through the multilevel diffusion differentiated permeable membrane that generates a pressure differential across the multilevel diffusion differentiated permeable membrane.

34. The method of claim 33, wherein the pressure differential is calculated to overcome diffusion of plating solution additives through the multilevel diffusion differentiated permeable membrane from the cathode compartment to the anode compartment.

35. The method of claim 33, wherein the multilevel diffusion differentiated permeable membrane is configured to generate a pressure drop across the membrane, which at low flow rates, remains greater than macroscopic pressure differentials that are generated by momentum changes in the fluid near the membrane.

36. The method of claim 33, wherein the multilevel diffusion differentiated permeable membrane is configured to prevent a reverse flow direction through the multilevel diffusion differentiated permeable membrane when pressure fluctuations occur over time or spatially across the membrane.

37. The method of claim 33, wherein the multilevel diffusion differentiated permeable membrane includes a first and second membrane levels, the first membrane level being configured to generate a pressure drop across the first membrane level, which at low flow rates, remains greater than macroscopic pressure differentials that are generated by momentum changes in the fluid near the first porous membrane layer, and the second membrane level being configured to provide control over a concentration of a particular species diffusing therethrough.

38. The method of claim 33, wherein the pressure differential across the multilevel diffusion differentiated permeable membrane is calculated to overcome diffusion of plating solution additives through the multilevel diffusion differentiated permeable membrane towards the anode.

39. The method of claim 33, wherein the fluid flow between the anode compartment and the cathode compartment is in the direction going from the anode compartment toward the cathode compartment.

* * * * *

UNITED STATES PATENT AND TRADEMARK OFFICE
CERTIFICATE OF CORRECTION

PATENT NO. : 6,875,331 B2 Page 1 of 1
APPLICATION NO. : 10/194160
DATED : April 5, 2005
INVENTOR(S) : Harald Herchen It is certified that error appears in the above-identified patent and that said Letters Patent is hereby corrected as shown below:

Column 2, Line 16: Change "is" to --it--

Column 6, Line 25: Insert a period after "substrate"

Column 7, Line 7: change "up words" to --upwards--

Column 7, Line 30: After "contact", insert --with--

Column 9, Line 23: Delete the ")" after "nm"

Column 11, Line 27: Change equation (2) from $D\overline{V}^2C - v\overline{V}C = 0$ to $D\overline{V}^2C - v\overline{V}C = 0$ Signed and Sealed this Seventh Day of November, 2006

JON W. DUDAS
*Director of the United States Patent and Trademark Office*